United States Patent
Gulibon et al.

[15] 3,704,958
[45] Dec. 5, 1972

[54] ADJUSTABLE BORING BAR

[72] Inventors: Robert S. Gulibon, Mt. Pleasant; James W. Heaton, Greensburg, both of Pa.

[73] Assignee: Kennametal Inc., Latrobe, Pa.

[22] Filed: April 1, 1971

[21] Appl. No.: 130,190

[52] U.S. Cl. ............................... 408/153, 408/181
[51] Int. Cl. ............................................ B23b 29/08
[58] Field of Search............... 408/181, 185, 153, 156

[56] References Cited

UNITED STATES PATENTS

| | | | |
|---|---|---|---|
| 2,382,571 | 8/1945 | Kylin | 408/181 |
| 3,198,037 | 8/1965 | Yogus | 408/153 |
| 3,112,659 | 12/1963 | Klages et al. | 408/153 |

FOREIGN PATENTS OR APPLICATIONS

| | | | |
|---|---|---|---|
| 157,329 | 12/1956 | Sweden | 408/185 |

*Primary Examiner*—Gil Weidenfeld
*Attorney*—Melvin A. Crosby

[57] ABSTRACT

The specification discloses a boring bar having a shank with a head mounted on one end thereof by means of a dovetail tongue and groove arrangement. A clamp screw extends transversely through the groove and also through the tongue for clamping the shank and head together. A positive adjustment is provided for adjusting the head in both directions along the direction of the length of the groove.

3 Claims, 7 Drawing Figures

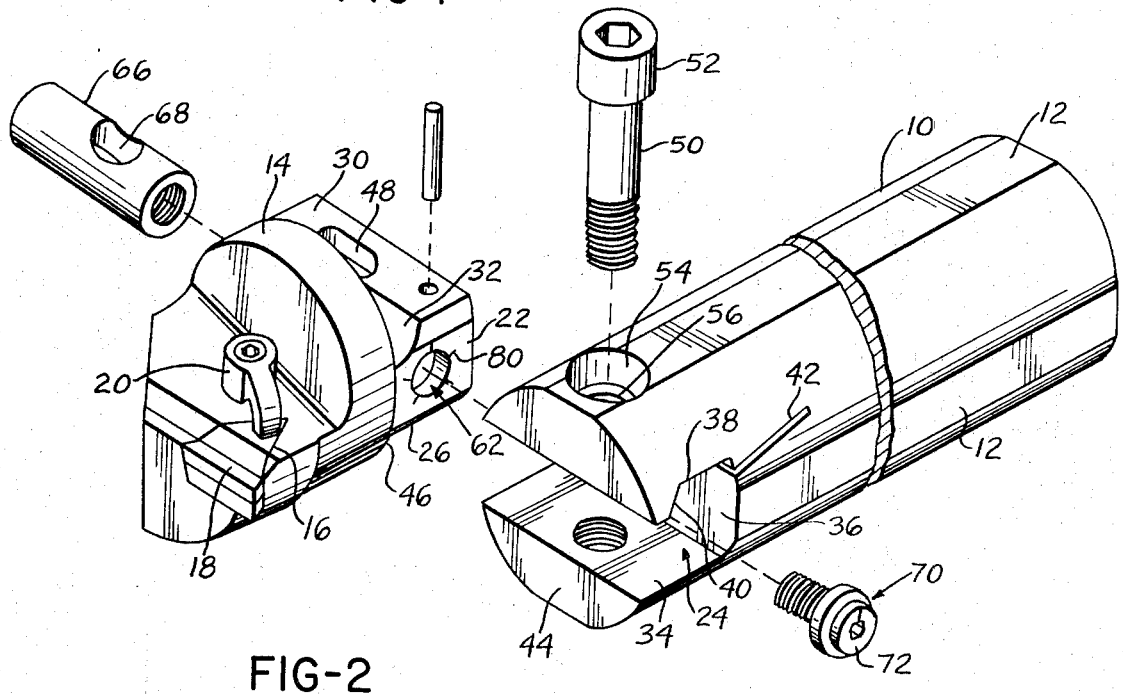
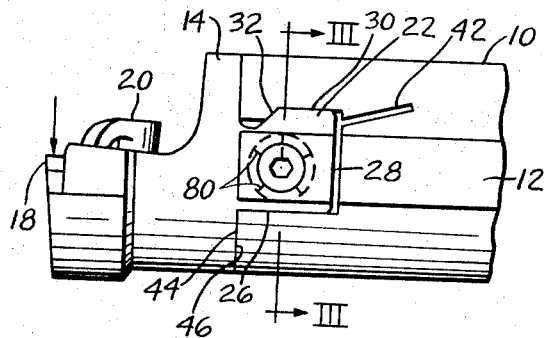
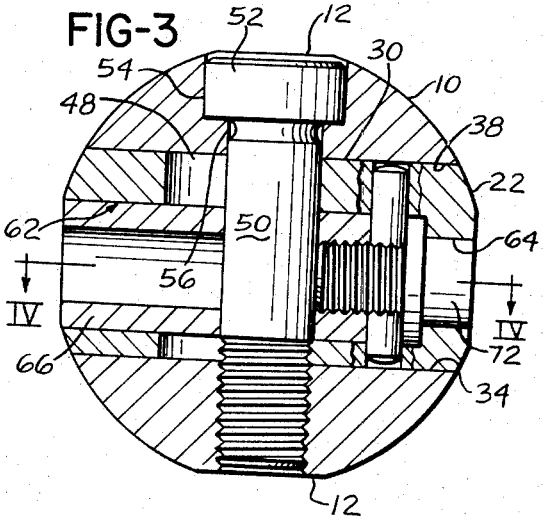
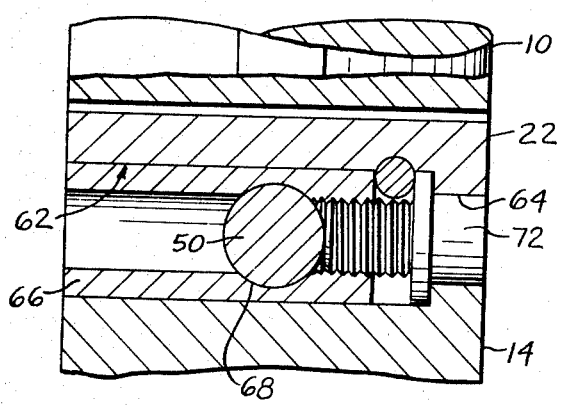

INVENTORS
ROBERT S. GULIBON
JAMES W. HEATON
BY 3,704,958

ADJUSTABLE BORING BAR

RELATED APPLICATION

U.S. Pat. Ser. No. 89,186, filed Nov. 13, 1970, for "ADJUSTABLE DOVETAIL BORING BAR" — William C. Eversole.

The present invention relates to boring bars and is particularly concerned with a boring bar having an adjustable head, especially a head which is radially adjustable. More particularly still, the present invention concerns an adjustable boring bar of the nature referred to in which the adjustment of the head on the shank of the boring bar in both directions is positive.

Boring bars having adjustable heads are known but, heretofore, have been somewhat expensive to manufacture and have been lacking in the support of the head on the shank of the bar. For the reason that the head was not extremely rigidly supported on the shank, such boring bars have generally been used only for taking relatively light cuts.

Still further, such bars have sometimes been provided with safety inter-locks between the heads and shanks thereof to prevent the head from accidentally becoming disengaged from the shank in case the machine operator should forget to tighten up the clamp screw, or in case of the clamp screw breaking, or by reason of some other fault occurring in respect of the clamping of the head to the shank.

With the foregoing in mind, the primary object of the present invention is the provision of a boring bar with a shank and a head thereon which is adjustable laterally relative to the axis of the shank in which the head is extremely solidly supported on the shank while the head is positively prevented from becoming disengaged from the shank by the same screw which effects the clamping up operation.

Another object of the present invention is the provision of an adjustable head boring bar structure which is relatively inexpensive to manufacture.

Still another object of the present invention is the provision of a boring bar of the nature referred to which permits relatively heavy cuts to be taken by a cutting insert carried by the head without any danger that the head will shift or deflect on the boring bar.

It is also an object of the present invention to provide a novel arrangement for positively adjusting the head on the shank of the boring bar in both directions.

These and other objects and advantages of the present invention will become more apparent upon reference to the following detailed specification, taken in connection with the accompanying drawings, in which:

FIG. 1 is an exploded perspective view showing the parts of an adjustable boring bar structure according to the present invention;

FIG. 2 is a side view showing the head of the boring bar and the portion of the shank adjacent the head;

FIG. 3 is a transverse sectional view indicated by line III—III on FIG. 2;

FIG. 4 is a plan sectional view indicated by line IV—IV on FIG. 3;

BRIEF SUMMARY OF THE INVENTION

Figure 5:
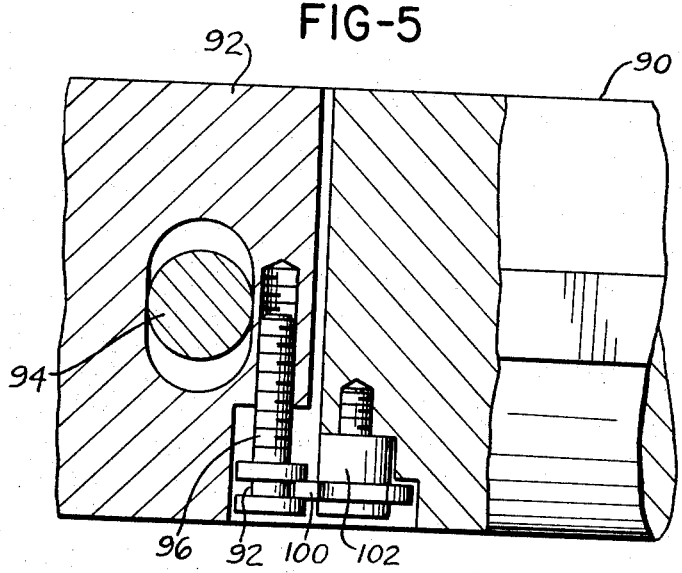
FIG. 5 is a plan sectional view through the tongue and groove portion of a boring bar shank and head according to the present invention showing another manner of effecting positive adjustment of the head on the bar in both directions.

The present invention relates to a boring bar having a radially adjustable head thereon. The adjustable head is connected to the boring bar by way of a dovetail having a relatively wide angle and a screw is provided for clamping the boring bar part of the dovetail connection to the part of the connection carried by the boring head and is arranged to extend directly through the dovetail portion carried by the adjustable head thereby providing for great strength and rigidity of connection of the head to the boring bar and eliminating the possibility of the head becoming disengaged from the boring bar during use.

Adjustment of the head on the boring bar is accomplished in a positive manner in both directions by a threaded adjusting mechanism which includes an element fixed to the shank and another element fixed to the head of the boring bar.

DETAILED DESCRIPTION

Referring to the drawings somewhat more in detail, the boring bar illustrated therein comprises a shank portion 10 which is an elongated generally cylindrical member adapted for being clamped in a suitable support therefor in a machine tool. The work may rotate relative to the boring bar or the boring bar may be rotated relative to the work. The boring bar illustrated is adapted for either type of operation. Shank 10 preferably has flats 12 formed thereon and extending longitudinally of the shank and providing convenient surfaces for nonrotatably clamping the shank fixedly to the support therefor.

At the one end, shank 10 carries a head 14 which has a pocket 16 in which a cutting insert 18 is clamped as by a top clamp member 20.

The head 14 on the side thereof facing the shank 10 is flat and is provided with a rearwardly protruding lateral extension or tongue 22 adapted for being slidably received in a lateral slot or groove 24 in the adjacent end of shank 10. Tongue 22 advantageously has an axially extending planar bottom surface 26, a diametral rear surface 28 and a top surface which comprises an axial portion 30 remote from the head and inclined portion 32 adjacent the head. The tongue 22 is thus in the form of a one-sided dovetail having an inclined surface on only one side thereof.

Shank 10 has a flat end thereon into which a diametral groove 24 is formed. The groove 24 in shank 10, similarly to tongue 22, has a bottom axially extending planar surface 34, a diametral rear surface 36, and a top surface comprising the axially extending portion 38 remote from the end of the shank and the inclined front part 40 adjacent the end of the shank and which is complementary to portion 32 of the top wall of tongue 22 on the head 14.

The boring bar, furthermore, includes a slot 42 extending generally axially of the boring bar from the bottom of groove 24 preferably at or near the juncture of the back wall 36 and portion 38 of the top wall of the groove 24 in the shank 10 of the boring bar. Slot 42 could be located anywhere along the back wall of groove 24 but is advantageously located as shown near the juncture of the aforementioned back wall and top wall portion of the groove for the reason that this location of the slot imparts the best action to the clamping up operation and likewise results in the strongest construction.

According to the present invention, the inter-engaging dovetail surfaces 32 and 40 are inclined at an angle of about 45 degrees to the axis of shank 10, although it will be understood that this angle could vary substantially within the purview of the present invention. The important thing about the angle of the inclined surfaces is that when the assembly is clamped together, the head be drawn toward the shank so the flat side of the head will firmly engage the flat end of the shank whereby the head will be exactly located and will be held against yielding, even under fairly high loads.

The flat end of shank 10 referred to is a planar end surface 44 and the flat side of the head 14 referred to facing shank 10 is a planar surface 46 for engagement with surface 44.

According to the present invention, the tongue 22 on the head of the boring bar is provided with a laterally elongated hole 48 to receive a clamp bolt 50 with clearance. Hole 48 could be in the form of a recess extending into said tongue from the rear end but is preferably in the form of a hole to keep the tongue as strong as possible.

Clamp bolt 50, as will best be seen in FIG. 3, has a head 52 receivable in a recess 54 provided therefor in the shank 10 in the region of the end of shank 10 adjacent head 14. Recess 54 is coaxial with a bore 56 in the shank which is threaded for receiving the threaded end of screw 50.

The location of screw 50 is of particular merit because it acts directly in the vicinity of the transverse plane of the inclined surfaces 32 and 40 and is thereby highly effective for drawing these surfaces tightly together, and, furthermore, for holding the surfaces in firm engagement once the screw has been tightened up.

Still further, the screw 50 passes through tongue 22 and this is of particular merit because, if it should happen that the machine operator inadvertently forgets to tighten up the clamping screw, the head 14 cannot be thrown off from the shank 10 even when the boring bar is of the rotating type.

As mentioned, the clamp screw holds the assembly tightly clamped together and this is of importance because it permits relatively heavy cuts to be taken by a boring bar according to the present invention without the load imposed on the insert carried by the head causing any tilting of the head on shank 10.

If the screw 50 were to be located rearwardly along a shank from head 14, as is the case in respect of certain other known types of adjustable head boring bars, one thereof being shown in the U.S. Pat. No. 3,433,104, there would be sufficient resilience in the assembly to permit the head to tilt under extremely heavy loads and this is, of course, highly objectionable.

The location of slot 42 near the top of the back wall of the groove in the end of shank 10 is important because the lower part of the boring bar remains a solid mass of metal and is, thus, in the best possible condition to sustain any thrusts imposed on the insert carried by the cutting head.

Assuming that the principal load on the cutting insert is downwardly as indicated by arrow 60 in FIG. 2, it will be evident that the tang on the top of the boring bar formed by the notch 42 and including at its outer end the wedge shaped portion that fits in the dovetail formed on the tongue 22 of the head, will be principally in tension while the surfaces 44 and 46 toward the bottom of head 14 will be placed principally in compression.

The disclosed arrangement thus forms an extremely strong and solid mounting for the head 14 of the boring bar and, furthermore, eliminates the possibility of injury to the shank 10 in the case of sudden shock loading on the head as can sometimes occur during machining operations when an insert breaks or when certain other unexpected events occur.

According to the present invention, an arrangement is provided for positively adjusting the head on the shank in both directions. This is accomplished by providing the tongue 22 with a bore 62 extending in the direction of adjustment of the head on the shank. The bore 62 has a reduced diameter portion 64 at one end. Slidably mounted in bore 62 is a nut element 66 which is transversely drilled at 68 for receiving the clamp screw 50.

The nut 66, in being bored as described for receiving clamp screw 50, is held against rotation relative to the shank of the tool structure and is also held against movement in the direction of adjustment of the head on the shank. Nut element 66 is threaded at one end and receives a threaded adjusting screw 70. Adjusting screw 70 has a head 72 disposed in the reduced diameter portion 64 of the bore in the tongue 22 and is provided with a socket for actuation by a wrench.

The adjusting screw also comprises a flange 74 larger than head 72 and substantially the same size as bore 62 in the tongue so that when the adjusting screw is in place, as it is shown in FIG. 3, it is prevented from moving rightwardly in bore 62.

Still further, the tongue is provided with a drilled hole 76 extending perpendicularly to the direction of adjustment of the head on the shank and adapted for receiving a pin 78 which engages flange 74 of adjusting screw 70 on the side thereof opposite head 72. Pin 78 prevents movement of adjusting screw 70 in bore 62 toward the left as it is viewed in FIG. 3 so that the adjusting screw will be seen to be supported in the tongue against axial movement therein while, however, being rotatable.

The arrangement provides for positive adjustment of the head on the shank in both directions by rotation of adjusting screw 70. When the adjusting screw is rotated in one direction, it will move to the right relative to the nut element 66 and carry with it head 14, due to the abutment of flange 74 of screw 70 with the bottom of the larger portion of bore 62. When the adjusting screw is turned in the other direction, it will be drawn into the nut element and will carry the head in the opposite direction due to the abutment of flange 74 with pin 78.

In either case, adjustment of the head can be made while some clamping pressure is exerted on the tongue so that the head will remain in its adjusted position until the clamp screw 50 can be tightened up. Once the clamp screw 50 is tightened up, the head is extremely solidly supported on the shank of the tool structure as has been explained in detail above.

As will be seen in FIG. 2, the end of the tongue 22 surrounding head 72 of the adjusting screw can be provided with indicia 80 which can be relied on to indicate the amount of adjustment imparted to the head by rotation of the adjusting screw.

Inasmuch as the clamp screw extending through the groove and tongue also represents a safety feature, because it prevents the head from becoming disengaged from the shank, it is possible further to enhance the safety aspect of the arrangement by providing a slightly weakened region in the clamp screw adjacent the head end (see FIG. 3) so that if the clamp screw should, for any reason, become stressed to the point of breaking, the fracture will occur at the weakened region of the screw thereby leaving in the shank that portion of the screw extending into the tongue on the head so that the head will be held on the shank till the machine can be brought to a halt and suitable repairs made in the boring bar, or the boring bar replaced by another.

Figure 6:
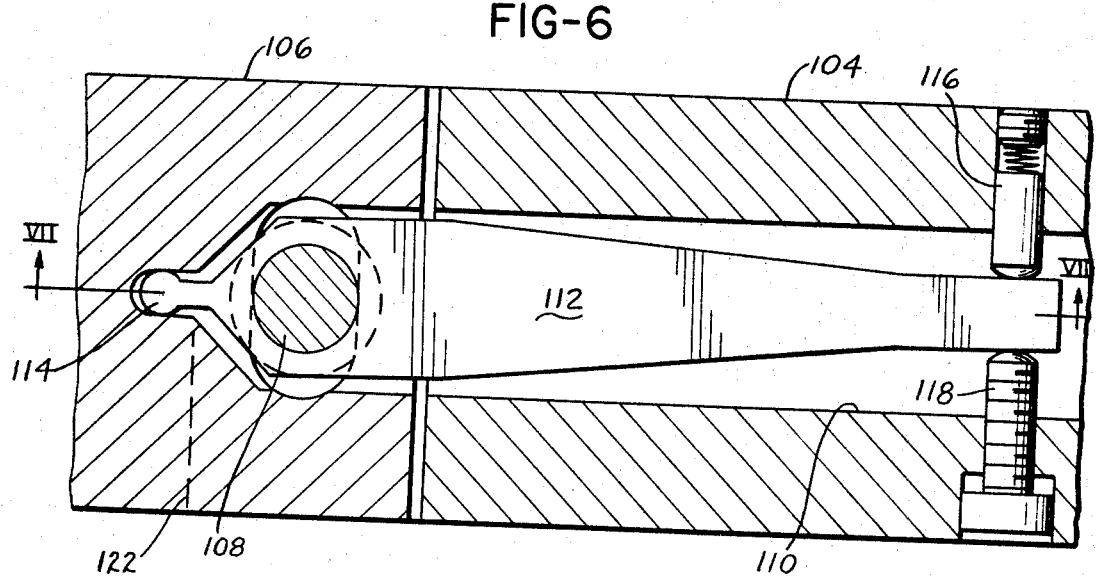
FIG. 6 is also a plan section through the tongue and groove portion of a boring bar and head according to the present invention showing still another adjusting arrangement for the head.
Figure 7:
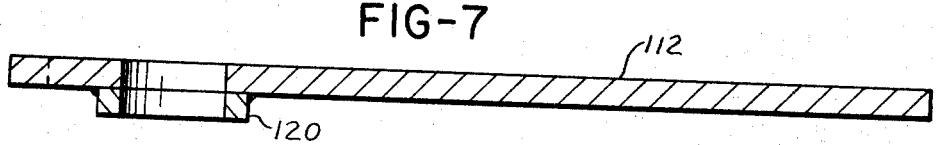
FIG. 7 is a sectional view taken on line VII—VII of FIG. 6.

Modified arrangements of the boring bar according to the present invention are shown in FIGS. 5, 6 and 7. In FIG. 5, the shank of the boring bar is indicated at 90 and the head is at 92 and the clamp screw carried by the boring bar and extending through the tongue on the head is indicated at 94. In the modification of FIG. 5, adjustment of the head laterally on bar 90 is effected by a screw 96 having a head with a groove 98 which is engaged by a flange 100 on a screw 102 fixed in the bar 90 adjacent the groove therein.

Screw 96 is threaded into the tongue portion of the head 92 and can be rotated to effect positive adjustment of the head laterally on bar 90. Obviously, either of the screws 96 or 102 could be mounted in the bar and the other thereof in the head and the same mode of operation would obtain.

In FIGS. 6 and 7, the boring bar is indicated at 104 and the head at 106. The clamp screw that clamps the head in adjusted positions on the bar is indicated at 108. According to the modification of FIGS. 6 and 7, the shank of the boring bar is provided with an axial bore 110 and pivotally mounted on clamp screw 108 is a lever 112 extending axially along bore 110 with clearance on each side thereof.

Lever 112 fits closely on clamp screw 108 and on the side of the clamp screw opposite the part of lever 112 that extends into the shank of the boring bar is a nose portion 114 fitting into a recess provided therefor in the head 106.

The boring bar also carries a spring pressed plunger 116 engaging lever 112 on one side and an adjusting screw 118 that engages the lever on the side opposite the spring pressed plunger 116.

It will be evident that, upon loosening clamp screw 108, lever 112 can be caused to pivot about the axis of the clamp screw in one direction or another by rotation of adjusting screw 118 and that this will cause gradual shifting of head 106 on shank 104. Further, the distance between the point where portion 114 engages head 106 and the axis of clamp screw 108 is one-fifth the distance from the axis of the clamp screw to the point where adjusting screw 118 engages lever 112.

With the lever proportioned in the described manner, screw 118 can be a 40 pitch screw, so that one rotation of the screw will cause it to move axially 0.025 inches. With the lever proportioned in the described manner, this will produce lateral movement of the head in the amount of 0.005 inches.

Thus, by inscribing the head of screw 118 with five marks, spaced uniformly circumferentially of the screw, and providing shank 104 with a single index mark adjacent the head, the amount of lateral adjustment of the head in thousandths of an inch can easily be determined.

FIG. 7 shows the lever 112 in cross section, and it will be seen to be a relatively thin bar-like member with an integral bushing 120 to increase the bearing of the lever on the clamp screw so that the lever is supported against tilting on the screw by the length of the said bearing, while being freely pivotal on the screw about the axis thereof.

The FIGS. 6 and 7 arrangement could be made positive in both directions of adjustment by providing opposing screws for engaging the long arm of lever 112, or by threading a screw through the arm, or by utilizing for adjustment purposes a screw with a circumferential groove engaged by the longer arm of lever 112.

In most cases, it is adequate resiliently to urge the lever 112 in one direction and to move it positively by screw in the opposite direction but, as mentioned, if positive adjustment of the lever in both directions is desired, this can be accomplished in a number of different ways.

Assembly of the FIG. 6 modification is made easier by providing a recess in one side of head 106 to the right of line 122. This recess provides space to accommodate the end of lever 112 during assembly so that bore 110 does not need to be made deep enough to receive the entire length of the lever.

Modifications may be made within the scope of the appended claims.

What is claimed is:

1. A tool device comprising; first and second members, one of said members forming a support and the other thereof being adapted to receive a cutting element, a linear groove formed in said first member and a bar-like tongue on the other of said members slidably fitted into said groove, a clamp screw in said first member extending through said groove and also through said tongue at right angles thereto, said tongue having an opening receiving said clamp screw and elongated in a direction parallel to said tongue and groove, said tongue including a bore parallel to said tongue and groove and at right angles to said clamp screw and intersected by said clamp screw, an element slidably fitting said bore and having a hole therein parallel to and closely receiving said clamp screw, and an adjusting screw parallel to said bore and rotatable but nonaxially moveable in said tongue and threadedly engaging said element.

2. A tool device according to claim 1 in which said adjusting screw at the head end comprises oppositely facing annular shoulders, and means in said tongue forming abutment elements engaging said shoulders thereby to hold said adjusting screw in the tongue against axial movement therein while permitting rotation of the adjusting screw in the tongue.

3. A tool device according to claim 1 in which said element is tubular and is internally threaded at at least one end to receive said adjusting screw, said bore in the tongue terminating in a reduced diameter portion at the end adjacent the threaded end of said element, said adjusting screw having a head rotatably fitting said reduced diameter portion of the bore in the tongue and having a flange engaging the bottom of the larger diameter portion of the bore in the tongue, and a pin in the tongue engaging the said flange on the side thereof facing said element.

* * * * *